(12) United States Patent
Srivastava et al.

(10) Patent No.: US 10,310,914 B2
(45) Date of Patent: Jun. 4, 2019

(54) METHODS AND SYSTEMS FOR RECURSIVELY ACQUIRING AND RELEASING A SPINLOCK

(71) Applicant: Ciena Corporation, Hanover, MD (US)

(72) Inventors: Arvind Kishore Srivastava, New Delhi (IN); Randy Hilderman, Nepean (CA)

(73) Assignee: Ciena Corporation, Hanover, MD (US)

( * ) Notice: Subject to any disclaimer, the term of this patent is extended or adjusted under 35 U.S.C. 154(b) by 200 days.

(21) Appl. No.: 15/090,846

(22) Filed: Apr. 5, 2016

(65) Prior Publication Data

US 2017/0242736 A1 Aug. 24, 2017

(30) Foreign Application Priority Data

Feb. 22, 2016 (IN) .............................. 201611006024

(51) Int. Cl.
*G06F 9/46* (2006.01)
*G06F 9/52* (2006.01)

(52) U.S. Cl.
CPC .................................... *G06F 9/526* (2013.01)

(58) Field of Classification Search
None
See application file for complete search history.

(56) References Cited

U.S. PATENT DOCUMENTS 6,247,025 B1 * 6/2001 Bacon ............... G06F 17/30362
6,772,153 B1 * 8/2004 Bacon .................... G06F 9/526
2005/0273782 A1 * 12/2005 Shpeisman ............... G06F 9/52
718/100
2005/0289549 A1 * 12/2005 Cierniak ................. G06F 9/526
718/102
2009/0328041 A1 * 12/2009 Sudzilouski ............ G06F 9/526
718/100

OTHER PUBLICATIONS

Starke, Locking in OS Kernals for SMP Systems, TU BErlin, Mar. 2006, 22 pages.*
"Implementing a recursive read-write spinlock", accessed Jan. 27, 2016, https://jfdube.wordpress.com, pp. 1-12.
(Continued)

*Primary Examiner* — Diem K Cao
(74) *Attorney, Agent, or Firm* — Clements Bernard Walker PLLC; Christopher L. Bernard; Lawrence A. Baratta, Jr.

(57) ABSTRACT

A computer-implemented method for a recursive spinlock includes storing a recursion level for the recursive spinlock in memory; responsive to a request to acquire the recursive spinlock by a process, performing one of (i) acquiring the recursive spinlock if not presently held by the process and incrementing the recursion level and (ii) incrementing the recursion level if the recursive spinlock is presently held by the process; and responsive to a request to release the recursive spinlock by the process, decrementing the recursion level and releasing the recursive spinlock if the recursion level is zero. The recursive spinlock can be implemented in a software wrapper used with existing software which supports recursive locks and the recursive spinlock is used in place of the recursive locks in the existing software. The computer-implemented method can be performed on a Symmetric Multiprocessor (SMP) hardware system.

16 Claims, 4 Drawing Sheets

(56) References Cited

OTHER PUBLICATIONS

"Patchwork [API-NEXT, 1/2] api: spinlock_recursive:", accessed Jan. 27, 2016, http://patches.opendataplane.org, pp. 1-21.
"RE: recursive spinlocks. Shoot.", accessed Jan. 27, 2016, http://www.cs.helsinki.fi/linux/linux-kernal/2003-20/1041.html, pp. 1-6.
Cleary, Stephen, "Recursive (Re-entrant) Locks", accessed Jan. 27, 2016, http://blog.stephencleary.com, pp. 1-11.
Love, Robert, "Kernel Locking Techniques", Linux Journal, accessed Jan. 27, 2016, http://linuxjurnal.com, pp. 1-11.

* cited by examiner

METHODS AND SYSTEMS FOR RECURSIVELY ACQUIRING AND RELEASING A SPINLOCK

CROSS-REFERENCE TO RELATED APPLICATION(S)

The present patent application/patent claims the benefit of priority of Indian Patent Application No. 201611006024, filed on Feb. 22, 2016, and entitled "METHODS AND SYSTEMS FOR RECURSIVELY ACQUIRING AND RELEASING A SPINLOCK," the contents of which are incorporated in full by reference herein.

FIELD OF THE DISCLOSURE

The present disclosure generally relates to computing systems and methods. More particularly, the present disclosure relates to methods and systems for recursively acquiring and releasing a spinlock such as in the context of porting older software to Symmetric Multiprocessor (SMP)-based hardware.

BACKGROUND OF THE DISCLOSURE

A spinlock is a lock which causes a thread trying to acquire it to wait simply in a loop ("spin") while repeatedly checking if the lock is available. Since the thread remains active but is not performing a useful task, the use of such a lock is a kind of busy waiting. Once acquired, spinlocks will usually be held until they are explicitly released, although in some implementations they may be automatically released if the thread being waited on (that which holds the lock) blocks, or "goes to sleep." Because they avoid overhead from operating system process rescheduling or context switching, spinlocks are efficient if threads are likely to be blocked for only short periods. For this reason, operating-system kernels often use spinlocks. By design, no formal technique exists to lock recursively a spinlock. Conventionally, if an attempt was made to lock a spinlock that was already held by a task, pthread or Interrupt Service Routine (ISR), then a livelock situation was encountered, and the spinlock would never be claimed. Conventional coding techniques understand this limitation and software engineers carefully engineer code to avoid such situations.

Specifically, spinlocks were introduced for mutual exclusion on Symmetric Multiprocessor (SMP) architectures and runtime environments. It would be advantageous to support a recursive spinlock, especially in the context of providing SMP support for existing software which supports recursive ISR calls to remove the need to rewrite the existing software.

BRIEF SUMMARY OF THE DISCLOSURE

In an exemplary embodiment, a computer-implemented method for a recursive spinlock includes storing a recursion level for the recursive spinlock in memory; responsive to a request to acquire the recursive spinlock by a process, performing one of (i) acquiring the recursive spinlock if not presently held by the process and incrementing the recursion level and (ii) incrementing the recursion level if the recursive spinlock is presently held by the process; and, responsive to a request to release the recursive spinlock by the process, decrementing the recursion level and releasing the recursive spinlock if the recursion level is zero. The recursive spinlock can be implemented in a software wrapper used with existing software which supports recursive locks and the recursive spinlock can be used in place of the recursive locks in the existing software. The computer-implemented method can be performed on a Symmetric Multiprocessor (SMP) hardware system. Responsive to the request to release the recursive spinlock by the process, the method can further include, responsive to the recursion level being negative, incrementing the recursion level and returning success. Responsive to the request to acquire the recursive spinlock by the process, the method can further include returning one of success and failure to the process based on the acquiring the recursive spinlock. Responsive to the request to release the recursive spinlock by the process, the method can further include returning one of success and failure to the process based on the releasing the recursive spinlock.

Responsive to the request to release the recursive spinlock by the process, the method can further include checking the recursion level subsequent to the decrementing; responsive to the recursion level being negative indicative that the recursive spinlock was not acquired by the process, setting the recursion level to zero and returning success to the process; responsive to the recursion level being zero indicative that the recursive spinlock has been released from a last level of recursion, releasing the spinlock and returning one of success or failure based on the releasing of spinlock; and responsive to the recursion level being positive indicative the release being a midlevel call, returning success to the process. The process can include one of a task, an Interrupt Service Routine (ISR), and a pthread. The acquiring and the releasing can be performed via a non-recursive Operating System Application Programming Interface (API). The computer-implemented method can be performed in one or more of VxWorks and Linux. The computer-implemented method can further include subsequent to the process releasing the recursive spinlock, preventing the process from decrementing the recursion level unless the process holds the recursive spinlock.

In another exemplary embodiment, an apparatus adapted to provide a recursive spinlock includes one or more processors; and memory storing instructions that, when executed, cause the one or more processors to store a recursion level for the recursive spinlock in memory, responsive to a request to acquire the recursive spinlock by a process, perform one of (i) acquisition of the recursive spinlock if not presently held by the process and increment the recursion level and (ii) increment the recursion level if the recursive spinlock is presently held by the process, and, responsive to a request to release the recursive spinlock by the process, decrement the recursion level and release the recursive spinlock if the recursion level is zero. The recursive spinlock can be implemented in a software wrapper used with existing software which supports recursive locks and the recursive spinlock can be used in place of the recursive locks in the existing software. The one or more processors can include a plurality of processors in a Symmetric Multiprocessor (SMP) hardware system. Responsive to the request to release the recursive spinlock by the process, the memory storing instructions that, when executed, can further cause the one of the one or more processors to, responsive to the recursion level being negative, increment the recursion level, and return success.

Responsive to the request to acquire the recursive spinlock by the process, the memory storing instructions that, when executed, can further cause the one or more processors to return one of success and failure to the process based on the acquisition of the recursive spinlock. Responsive to the request to release the recursive spinlock by the process, the memory storing instructions that, when executed, can further cause the one or more processors to return one of success and failure to the process based on the release of the recursive spinlock. Responsive to the request to release the recursive spinlock by the process, the memory storing instructions that, when executed, can further cause the one of the one or more processors to check the recursion level subsequent to the decrement, responsive to the recursion level being negative indicative that the recursive spinlock was not acquired by the process, set the recursion level to zero and return success to the process, responsive to the recursion level being zero indicative that the recursive spinlock has been released from a last level of recursion, release the spinlock and return success to the process, and, responsive to the recursion level being positive indicative the release being a midlevel call, return success to the process. The process can include one of a task, an Interrupt Service Routine (ISR), and a pthread.

In a further exemplary embodiment, a non-transitory computer readable medium including instructions that, when executed, cause one or more processors to perform steps of storing a recursion level for the recursive spinlock in memory; responsive to a request to acquire the recursive spinlock by a process, performing one of (i) acquiring the recursive spinlock if not presently held by the process and incrementing the recursion level and (ii) incrementing the recursion level if the recursive spinlock is presently held by the process; and, responsive to a request to release the recursive spinlock by the process, decrementing the recursion level and releasing the recursive spinlock if the recursion level is zero.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to methods and systems for recursively acquiring and releasing a spinlock such as in the context of porting older software to Symmetric Multiprocessor (SMP)-based hardware. The recursive spinlock described herein allows recursive calls to lock the spinlock, tracks how many times (depth of recursion) the spinlock has been acquired at any point in time, protects from any error scenario where there is a release of a spinlock being called without first acquiring it, and does not release the spinlock until it is released a same number of times as it was acquired. One exemplary application of the recursive spinlock is in the context of porting existing software, written for older, non-SMP architectures, to operate on SMP architectures and runtime environments. Here, the recursive spinlock can be used in a software wrapper in conjunction with the existing software, such as to replace Interrupt locks with the recursive spinlock. The Interrupt lock in the existing software supports recursive calls. The software wrapper is a data structure or software that contains ("wraps around") the existing software, so that the contained elements can exist in the newer system, i.e., the SMP architecture. The term wrapper is often used with component software, where a wrapper is placed around a legacy routine to make it behave like an object. This is also called "encapsulation" or "wrapper encapsulation," but is not the same as "object encapsulation," a fundamental concept of object technology.

Figure 1:
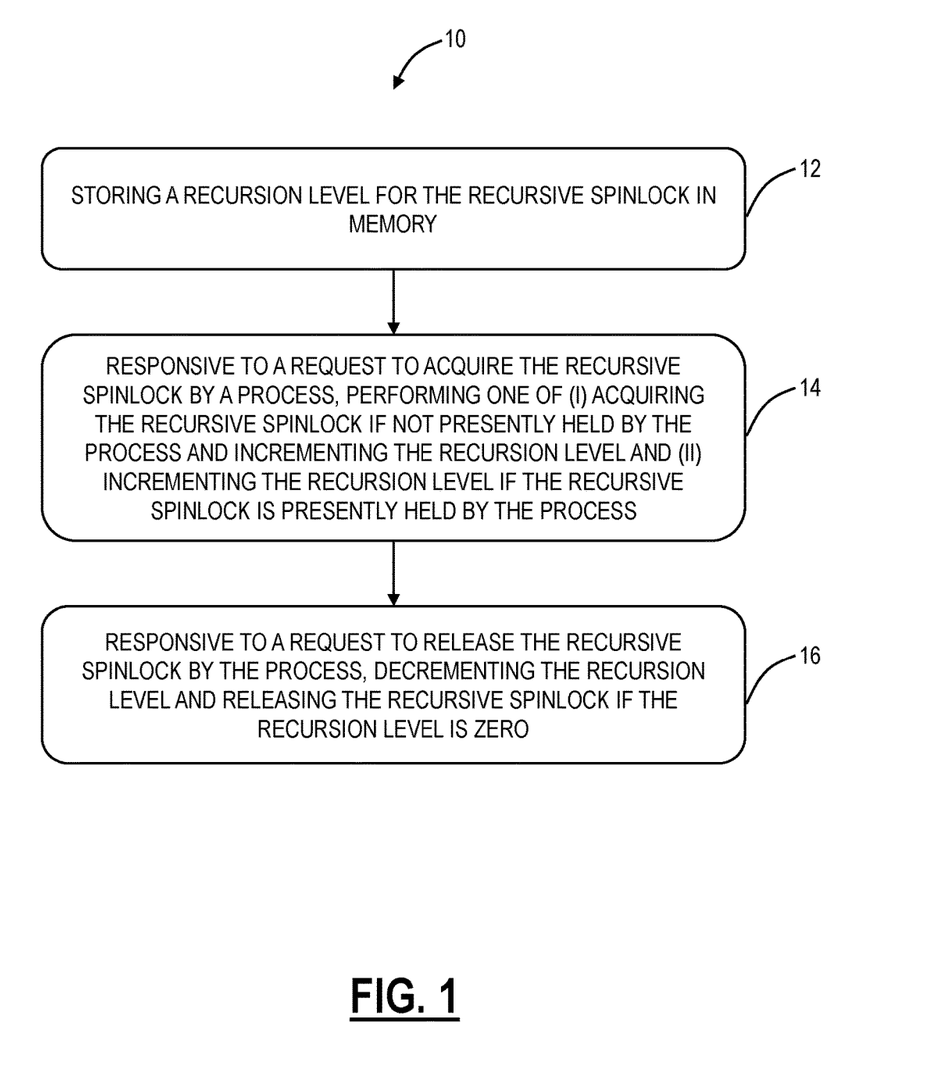
FIG. 1 is a flowchart of a computer-implemented method for a recursive spinlock.

Referring to FIG. 1, in an exemplary embodiment, a flowchart illustrates a computer-implemented method 10 for a recursive spinlock. The computer-implemented method includes storing a recursion level for the recursive spinlock in memory (step 12); responsive to a request to acquire the recursive spinlock by a process, performing one of (i) acquiring the recursive spinlock if not presently held by the process and incrementing the recursion level and (ii) incrementing the recursion level if the recursive spinlock is presently held by the process (step 14); and, responsive to a request to release the recursive spinlock by the process, decrementing the recursion level and releasing the recursive spinlock if the recursion level is zero (step 16). The recursive spinlock can be implemented in a software wrapper used with existing software which supports recursive locks and the recursive spinlock is used in place of the recursive locks in the existing software. The computer-implemented method 10 can be performed on a Symmetric Multiprocessor (SMP) hardware system.

Responsive to the request to acquire the recursive spinlock by the process, the method 10 can further include returning one of success and failure to the process based on the acquiring the recursive spinlock. Responsive to the request to release the recursive spinlock by the process, the method 10 can further include returning one of success and failure to the process based on the releasing the recursive spinlock. Responsive to the request to release the recursive spinlock by the process, the method 10 can further include checking the recursion level subsequent to the decrementing; responsive to the recursion level being negative indicative that the recursive spinlock was not acquired by the process, setting the recursion level to zero and returning success to the process; responsive to the recursion level being zero indicative that the recursive spinlock has been released from the last level of recursion, releasing the spinlock and returning success to the process; and, responsive to the recursion level being positive indicative the release being a midlevel call, returning success to the process.

The process can include one of a task, an Interrupt Service Routine (ISR), and a pthread. The acquiring and the releasing can be performed via a non-recursive Operating System Application Programming Interface (API). The computer-implemented method 10 can be performed in one or more of VxWorks and Linux.

The method 10 is a safe, recursive technique to acquire and release the spinlock. The method 10 is able to provide the depth of recursion at any given time. Again, in operating systems (like in VxWorks 6.9 and Linux) spinlocks cannot be called recursively, i.e., doing so will result in a livelock situation where the acquiring task or ISR waits for the spinlock it already holds. By safe, the method 10 ensures that regardless of the recursion depth, the recursive spinlock never results in a livelock or deadlock situation. Some design scenarios may result in calling spinlock recursively such as on SMP. The method 10 provides a technique for a recursive safe call to lock and release a spinlock.

The method 10 can include reserving a global memory for storing the recursion level. The recursion level is a depth of recursion at a time for a given recursive spinlock. The recursion level stores the number of times the spinlock has been acquired by a process (task, ISR, pthread) at any given point in time. The process running on any processor (CPU) can acquire/release the recursive spinlock so the recursion level should be stored in a global variable per spinlock or an extended structure with the recursion level along with the spinlock type.

Figure 2:
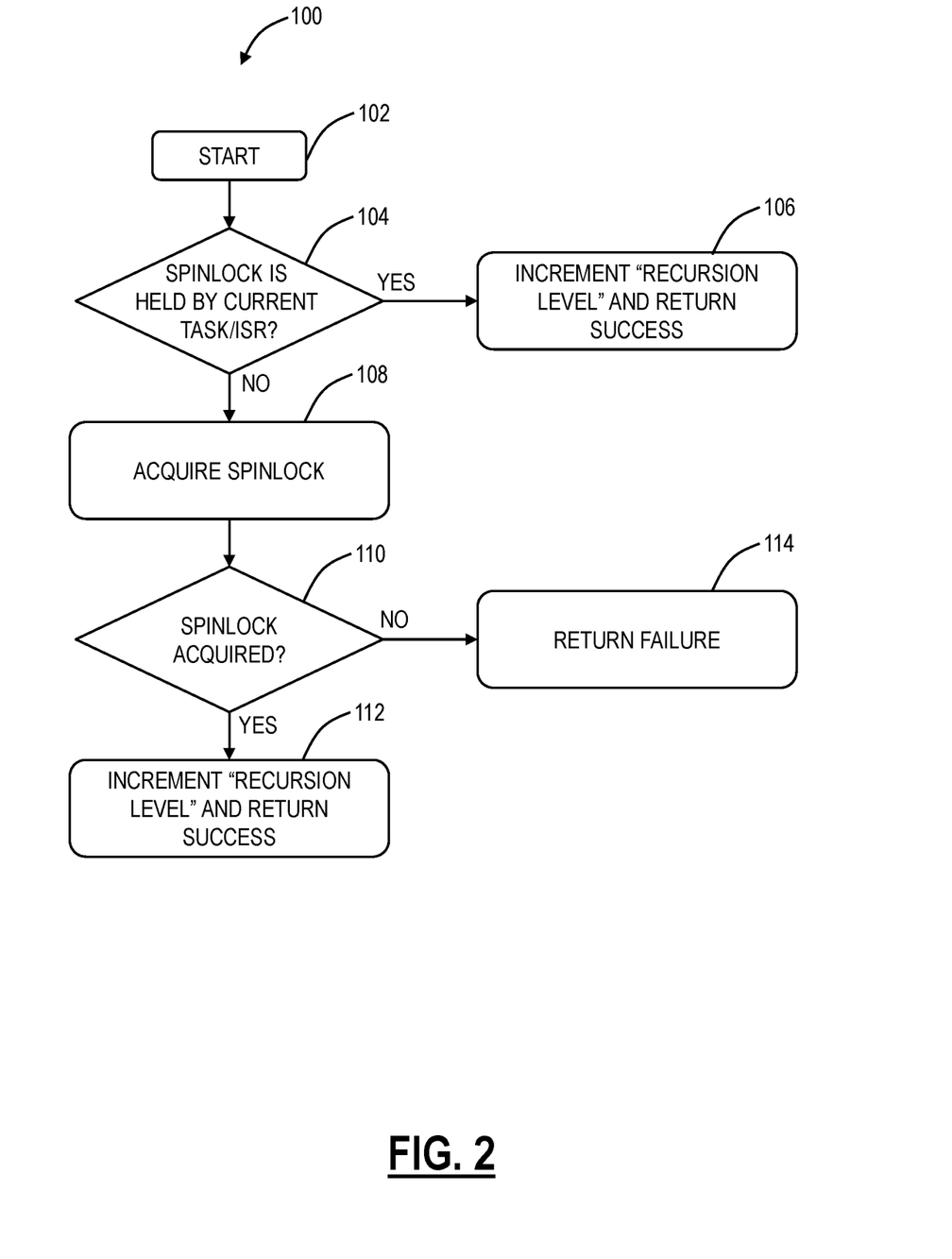
FIG. 2 is a flowchart of a method for acquiring the recursive spinlock detailing additional details of acquiring step in the computer-implemented method of FIG. 1.

Referring to FIG. 2, in an exemplary embodiment, a flowchart illustrates a method 100 for acquiring the recursive spinlock detailing additional details of step 14 in the computer-implemented method 10. The method 100 starts (step 102) responsive to a call to acquire the recursive spinlock. The method 100 first includes testing that if the recursive spinlock is already held by the current process (e.g., Task/ISR) or not (step 104). The current process is the one making the call. If it is already held (step 104), then the method 100 includes increment the "Recursion Level" and returning Success from the call (step 106). If the current process is not holding the recursive spinlock (step 104), then the method 100 includes attempting to acquire the spinlock such as by calling a non-recursive OS API (step 108). The method 100 includes checking if the recursive spinlock is successfully acquired (step 110). If the acquisition is successful (step 110), then the method 100 includes incrementing the "Recursion Level" and returning Success to the call (step 112). If the acquisition is a failure (step 110), then the method 100 includes returning a failure to the call (step 114).

Figure 3:
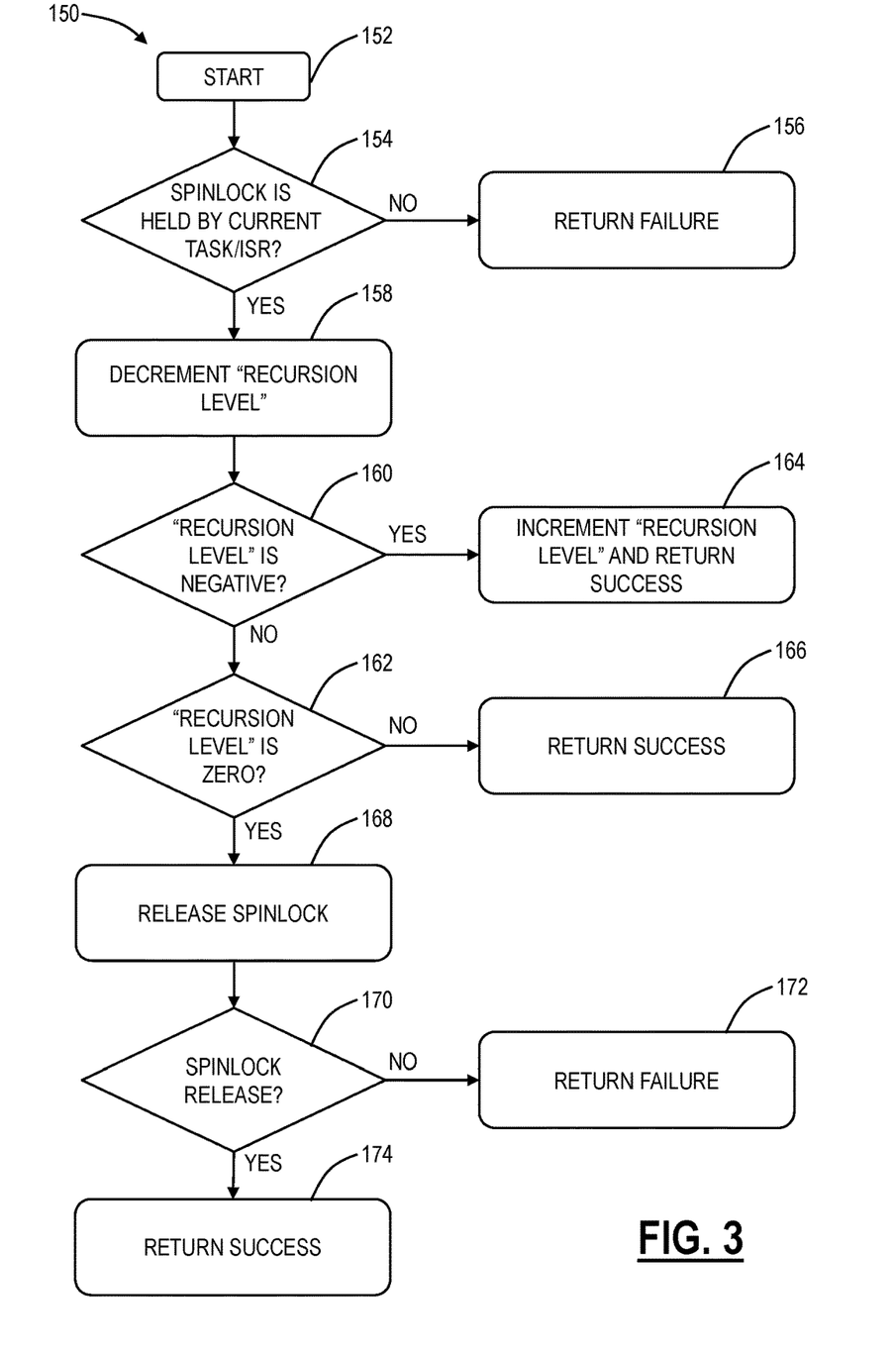
FIG. 3 is a flowchart of a method for releasing the recursive spinlock detailing additional details of releasing step in the computer-implemented method of FIG. 1.

FIG. 3 is a flowchart of a method for releasing the recursive spinlock detailing additional details of releasing step in the computer-implemented method of FIG. 1. The method 150 starts (step 152) responsive to a call to release the recursive spinlock. The method 150 includes first testing whether the recursive spinlock is held by the current process (e.g., Task/ISR) or not (step 154). Again, the current process is the one making the call. If the recursive spinlock is not held by the current process (step 154), then the method 150 includes returning a failure to the call (step 156). If the recursive spinlock is held by the current process (step 154), then the method 150 includes decrementing the "Recursion Level" (step 158) and checking if the "Recursion Level" is negative (step 160) or zero (step 162).

If "Recursion Level" becomes negative (step 160), then it means the recursive spinlock was not acquired by the call, and the release of spinlock has been called by mistake. The method 150 can include restoring the "Recursion Level" to zero and returning Success to the call (step 164). This is an optional check as only task/ISR holding recursive spinlock is allowed to decrement the "Recursion Level." Through step 164, the method 100 is safe, preventing a livelock or deadlock scenario.

If "Recursion Level" remains positive then it means that spinlock is released from a midlevel of recursion and more calls of this method 150 will be needed to release the spinlock finally. Thus, if "Recursion Level" is not zero (step 162), the method 150 includes returning Success to the call after the decrementing (step 166).

If "Recursion Level" becomes zero (step 162), then it means that the recursive spinlock has been released from the last level of recursion, so the method 150 includes attempting to release the recursive spinlock such as by calling non-recursive OS API (step 168). The method 150 includes checking if the recursive spinlock was successfully released (step 170). If the recursive spinlock is not released (step 170), then the "Recursion Level" is incremented, and a Failure is returned (step 172). If the recursive spinlock is released (step 170), then Success is returned (step 174).

An implementation of these methods 10, 100, 150 in C on VxWorks 6.9, SMP platform for ISR callable spinlock is provided as follows. These same techniques can be applied to Linux or other operating systems.

```
int_sl_t spinlock_int;
int spinlock_level; /*   Global storage for "Recursion Level" */
/*Implementation forAcquiring spinlock */
int acquire_spinlock(void)
{
    int rc;
    /* Test if ISR callable spinlock is already held by current cpu*/
    if (int_sl_held(&spinlock_int))
    {
        /* spin lock already Held... so increment Recursion Level and
return Success. */
        spinlock_level++;
        return 0;
    }
    /* ISR callable spinlock is not already held by current cpu attempt to
acquire it */
    rc = int_sl_lock(&spinlock_int);
    if (rc == 0)
    {
        /* Spinlock is acquired increment the Recursion Level */
        spinlock_level++;
    }
    return rc;
}
/* Implementation for Releasing spinlock */
int release_spinlock(void)
{
    int rc = 0;
    /* Test if ISR callable spinlock is already held by current cpu*/
    if (!int_sl_held(&spinlock_int))
    {
        /* Error release has been called from the CPU not holding it. */
        return -1;
    }
    /* Decrement the Recursion Level */
    spinlock_level--;
    /* Releasing the lock though no lock has been acquired */
    if (spinlock_level < 0)
    {
        /* Restore the Recursion Level to zero and return Success*/
        spinlock_level = 0;
        return rc;
    }
    /* Test if the call has been made from outer most recursion level */
    if (spinlock_level == 0)
    {
        /* Attempt to unlock the spinlock */
        rc = int_sl_unlock(&spinlock_int);
        if (rc != 0)
        {
            /* error in unlocking so increment the Recursion Level
(restore it) and return failure*/
            spinlock_level++;
            return rc;
        }
    }
    /The Spinlock is being released from middle level of recursion so
return success */
    return rc;
}
```

Hardware

Figure 4:
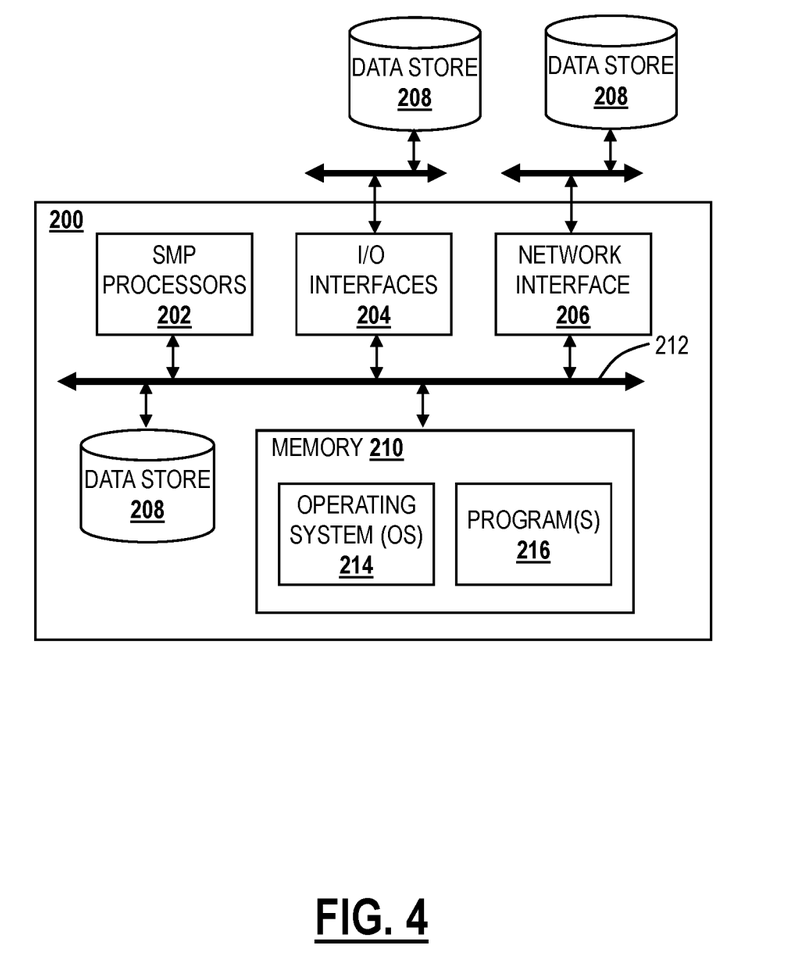
FIG. 4 is a block diagram of a hardware system for implementing the computer-implemented method of FIG. 1.

Referring to FIG. 4, in an exemplary embodiment, a block diagram illustrates a hardware system 200 for implementing the computer-implemented method 10, 100, 150. The hardware system 200 may be a digital computer or other type of processing system that, in terms of hardware architecture, generally includes one or more processors 202, input/output (I/O) interfaces 204, a network interface 206, a data store 208, and memory 210. It should be appreciated by those of ordinary skill in the art that FIG. 4 depicts the hardware system 200 in an oversimplified manner, and a practical embodiment may include less or additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processors 202 are a hardware device for executing software instructions. The processors 202 may be any custom made or commercially available processor, a central processing unit (CPU), an auxiliary processor among several processors associated with the hardware system 200, a semiconductor-based microprocessor (in the form of a microchip or chip set), or generally any device for executing software instructions. When the hardware system 200 is in operation, the processors 202 are configured to execute software stored within the memory 210, to communicate data to and from the memory 210, and to generally control operations of the hardware system 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the hardware system 200 to communicate on a network, such as the Internet, a wide area network (WAN), a local area network (LAN), and the like, etc. The network interface 206 may include, for example, an Ethernet card or adapter or a wireless local area network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the hardware system 200 such as, for example, an internal hard drive connected to the local interface 212 in the hardware system 200. Additionally, in another embodiment, the data store 208 may be located external to the hardware system 200 such as, for example, an external hard drive connected to the I/O interfaces 204 (e.g., SCSI or USB connection). In a further embodiment, the data store 208 may be connected to the hardware system 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an exemplary embodiment, the hardware system 200 is an adapted to provide a recursive spinlock. The apparatus can include the one or more processors 202, and the memory 210 storing instructions that, when executed, cause the one or more processors 202 to store a recursion level for the recursive spinlock in memory, responsive to a request to acquire the recursive spinlock by a process, perform one of (i) acquisition of the recursive spinlock if not presently held by the process and increment the recursion level and (ii) increment the recursion level if the recursive spinlock is presently held by the process, and, responsive to a request to release the recursive spinlock by the process, decrement the recursion level and release the recursive spinlock if the recursion level is zero. The recursive spinlock can be implemented in a software wrapper used with existing software which supports recursive locks and the recursive spinlock is used in place of the recursive locks in the existing software. The one or more processors 202 can include a plurality of processors in a Symmetric Multiprocessor (SMP) hardware system.

Responsive to the request to acquire the recursive spinlock by the process, the memory storing instructions that, when executed, further cause the one or more processors 202 to return one of success and failure to the process based on the acquisition of the recursive spinlock. Responsive to the request to release the recursive spinlock by the process, the memory storing instructions that, when executed, further cause the one or more processors 202 to return one of success and failure to the process based on the release of the recursive spinlock.

Responsive to the request to release the recursive spinlock by the process, the memory storing instructions that, when executed, further cause the one or more processors 202 to check the recursion level subsequent to the decrement, responsive to the recursion level being negative indicative that the recursive spinlock was not acquired by the process, set the recursion level to zero and return success to the process, responsive to the recursion level being zero indicative that the recursive spinlock has been released from a last level of recursion, release the spinlock and return success to the process, and, responsive to the recursion level being positive indicative the release being a midlevel call, return success to the process. The process can include one of a task, an Interrupt Service Routine (ISR), and a pthread. The acquisition and the release can be performed via a non-recursive Operating System Application Programming Interface (API).

In a further exemplary embodiment, software stored in a non-transitory computer readable medium includes instructions that, when executed, cause one or more processors to perform steps of storing a recursion level for the recursive spinlock in memory; responsive to a request to acquire the recursive spinlock by a process, performing one of (i) acquiring the recursive spinlock if not presently held by the process and incrementing the recursion level and (ii) incrementing the recursion level if the recursive spinlock is presently held by the process; and, responsive to a request to release the recursive spinlock by the process, decrementing the recursion level and releasing the recursive spinlock if the recursion level is zero.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for a recursive spinlock, the computer-implemented method comprising:
    storing a recursion level for the recursive spinlock in memory;
    responsive to a request to acquire the recursive spinlock by a process, performing one of (i) acquiring the recursive spinlock if not presently held by the process and incrementing the recursion level and (ii) incrementing the recursion level if the recursive spinlock is presently held by the process; and
    responsive to a request to release the recursive spinlock by the process, (i) decrementing the recursion level, (ii) determining the recursion level subsequent to the decrementing being negative, (iii) returning success and setting the recursion level to zero as the negative recursion level indicates the recursive spinlock was not acquired by the process,
    wherein the recursion level is incremented for each acquisition including initial acquisition of the recursive spinlock by the process and recursive acquisition where the process already holds the recursive spinlock.

2. The computer-implemented method of claim 1, wherein the recursive spinlock is implemented in a software wrapper used with existing software which supports recursive locks and the recursive spinlock is used in place of the recursive locks in the existing software.

3. The computer-implemented method of claim 1, wherein the computer-implemented method is performed on a Symmetric Multiprocessor (SMP) hardware system.

4. The computer-implemented method of claim 1, wherein, responsive to the request to acquire the recursive spinlock by the process, the method further comprises:
    returning one of success and failure to the process based on the acquiring the recursive spinlock.

5. The computer-implemented method of claim 1, wherein, responsive to the request to release the recursive spinlock by the process, the method further comprises:
    returning one of success and failure to the process based on the releasing the recursive spinlock.

6. The computer-implemented method of claim 1, wherein the process comprises one of
    a task, an Interrupt Service Routine (ISR), and a pthread.

7. The computer-implemented method of claim 1, wherein the acquiring and the releasing is performed via a non-recursive Operating System Application Programming Interface (API).

8. The computer-implemented method of claim 1, wherein the computer-implemented method is performed in one or more of VxWorks and Linux.

9. The computer-implemented method of claim 1, further comprising:
    subsequent to the process releasing the recursive spinlock, preventing the process from decrementing the recursion level unless the process holds the recursive spinlock.

10. An apparatus adapted to provide a recursive spinlock, the apparatus comprising:
    one or more processors; and
    memory storing instructions that, when executed, cause the one or more processors to
        store a recursion level for the recursive spinlock in memory, responsive to a request to acquire the recursive spinlock by a process, perform one of (i) acquisition of the recursive spinlock if not presently held by the process and increment the recursion level and (ii) increment the recursion level if the recursive spinlock is presently held by the process, and responsive to a request to release the recursive spinlock by the process, decrement the recursion level, release the recursive spinlock if the recursion level is zero, and return success if the recursion level is negative and set the recursion level to zero as the negative recursion level indicates the recursive spinlock was not acquired by the process, wherein the recursion level is incremented for each acquisition including initial acquisition of the recursive spinlock by the process and recursive acquisition where the process already holds the recursive spinlock.

11. The apparatus of claim 10, wherein the recursive spinlock is implemented in a software wrapper used with existing software which supports recursive locks and the recursive spinlock is used in place of the recursive locks in the existing software.

12. The apparatus of claim 10, wherein the one or more processors comprise a plurality of processors in a Symmetric Multiprocessor (SMP) hardware system.

13. The apparatus of claim 10, wherein, responsive to the request to acquire the recursive spinlock by the process, the memory storing instructions that, when executed, further cause the one or more processors to return one of success and failure to the process based on the acquisition of the recursive spinlock.

14. The apparatus of claim 10, wherein, responsive to the request to release the recursive spinlock by the process, the memory storing instructions that, when executed, further cause the one or more processors to return one of success and failure to the process based on the release of the recursive spinlock.

15. The apparatus of claim 10, wherein the process comprises one of a task, an Interrupt Service Routine (ISR), and a pthread.

16. A non-transitory computer readable medium comprising instructions that, when executed, cause one or more processors to perform steps of:

storing a recursion level for the recursive spinlock in memory;

responsive to a request to acquire the recursive spinlock by a process, performing one of (i) acquiring the recursive spinlock if not presently held by the process and incrementing the recursion level and (ii) incrementing the recursion level if the recursive spinlock is presently held by the process; and responsive to a request to release the recursive spinlock by the process, decrementing the recursion level, releasing the recursive spinlock if the recursion level is zero, and returning success if the recursion level is negative and setting the recursion level to zero as the negative recursion level indicates the recursive spinlock was not acquired by the process, wherein the recursion level is incremented for each acquisition including initial acquisition of the recursive spinlock by the process and recursive acquisition where the process already holds the recursive spinlock.

\* \* \* \* \*